US010824750B2

(12) United States Patent
De Lavarene et al.

(10) Patent No.: US 10,824,750 B2
(45) Date of Patent: Nov. 3, 2020

(54) SYSTEM AND METHOD FOR PERFORMING CONNECTION VALIDATION IN A MULTI-TENANT ENVIRONMENT

(71) Applicant: Oracle International Corporation, Redwood Shores, CA (US)

(72) Inventors: Jean De Lavarene, Versailles (FR); Aramvalarthanathan Namachivayam, Bangalore (IN); Vidya Hegde, Bangalore (IN); Saurabh Verma, Bangalore (IN); Chandra Sekhar Krishna Mahidhara, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 474 days.

(21) Appl. No.: 15/644,505

(22) Filed: Jul. 7, 2017

(65) Prior Publication Data
US 2018/0046820 A1 Feb. 15, 2018

Related U.S. Application Data

(60) Provisional application No. 62/374,487, filed on Aug. 12, 2016.

(51) Int. Cl.
| | |
|---|---|
| *G06F 16/00* | (2019.01) |
| *G06F 21/62* | (2013.01) |
| *H04L 29/06* | (2006.01) |
| *G06F 16/951* | (2019.01) |
| *H04L 29/08* | (2006.01) |

(52) U.S. Cl.
CPC ........ *G06F 21/6218* (2013.01); *G06F 16/951* (2019.01); *H04L 63/02* (2013.01); *H04L 63/061* (2013.01); *H04L 67/14* (2013.01)

(58) Field of Classification Search
CPC ... G06F 21/6218; G06F 16/951; H04L 67/14; H04L 63/061; H04L 63/02
See application file for complete search history.

(56) References Cited

U.S. PATENT DOCUMENTS

| 8,543,554 B1 * | 9/2013 | Singh ............... G06F 16/24552 |
| | | 707/690 |
| 9,098,565 B1 * | 8/2015 | Kumarjiguda ........ G06F 16/288 |
| (Continued) | | |

OTHER PUBLICATIONS

United States Patent and Trademark Office, Office Action dated Aug. 22, 2019 for U.S. Appl. No. 15/644,505, 16 Pages.

(Continued)

*Primary Examiner* — Alexander Khong
(74) *Attorney, Agent, or Firm* — Tucker Ellis LLP

(57) ABSTRACT

Described herein are systems and methods for providing access to a database in a multi-tenant environment, including the use of a connection pool, and support for efficient connection validation. For example, the system can support a "seconds to trust idle connection" functionality, which enables lazy validation of connections in the connection pool. The seconds to trust idle connection is the time period, expressed, for example, as a number of seconds, within a particular connection usage, that the connection pool trusts that the connection is still viable, and if so will skip a connection validation test before delivering the connection to a requesting application.

18 Claims, 8 Drawing Sheets

(56) References Cited

U.S. PATENT DOCUMENTS

| | | | |
|---|---|---|---|
| 9,361,366 B1 | 6/2016 | Yancey et al. | |
| 9,690,622 B1 | 6/2017 | Argenti et al. | |
| 10,095,800 B1 | 10/2018 | Yalamanchi | |
| 10,356,173 B2* | 7/2019 | Chang | H04L 67/1097 |
| 2004/0006711 A1 | 1/2004 | Krishnaswamy et al. | |
| 2004/0143562 A1* | 7/2004 | Chen | G06F 16/284 |
| 2005/0120117 A1* | 6/2005 | Burckart | G06F 9/5027 |
| | | | 709/227 |
| 2005/0187979 A1 | 8/2005 | Christensen et al. | |
| 2006/0146878 A1* | 7/2006 | Srivastava | G06F 9/5055 |
| | | | 370/469 |
| 2007/0136311 A1* | 6/2007 | Kasten | H04L 67/1008 |
| 2008/0008095 A1 | 1/2008 | Gilfix | |
| 2008/0228923 A1 | 9/2008 | Chidambaran et al. | |
| 2009/0034537 A1 | 2/2009 | Colrain et al. | |
| 2010/0036957 A1 | 2/2010 | Patel et al. | |
| 2011/0277027 A1 | 11/2011 | Hayton et al. | |
| 2011/0307615 A1 | 12/2011 | Krishnaswamy et al. | |
| 2012/0054245 A1* | 3/2012 | Colle | G06F 16/214 |
| | | | 707/792 |
| 2012/0066363 A1 | 3/2012 | Somogyi | |
| 2012/0221608 A1 | 8/2012 | An et al. | |
| 2013/0097204 A1 | 4/2013 | Venkataraman et al. | |
| 2014/0324911 A1* | 10/2014 | de Lavarene | G06F 16/90 |
| | | | 707/781 |
| 2014/0372484 A1 | 12/2014 | Baker et al. | |
| 2014/0378756 A1 | 12/2014 | Buster et al. | |
| 2014/0379756 A1* | 12/2014 | Shivarudraiah | G06F 16/252 |
| | | | 707/781 |
| 2015/0026405 A1* | 1/2015 | Hegde | G06F 12/0815 |
| | | | 711/122 |
| 2015/0095343 A1* | 4/2015 | Divilly | H04L 67/28 |
| | | | 707/741 |
| 2015/0127680 A1 | 5/2015 | Dutta et al. | |
| 2015/0169650 A1 | 6/2015 | Gajic | |
| 2015/0207758 A1 | 7/2015 | Mordani et al. | |
| 2017/0083386 A1 | 3/2017 | Wing et al. | |
| 2017/0331674 A1* | 11/2017 | Wang | H04L 67/1002 |
| 2017/0331829 A1* | 11/2017 | Lander | G06F 21/6218 |
| 2018/0019922 A1* | 1/2018 | Robison | H04L 47/826 |

OTHER PUBLICATIONS

United States Patent and Trademark Office, Office Action dated Sep. 18, 2019 for U.S. Appl. No. 15/644,502, 11 Pages.

Das, et al., "Oracle Database: JDBC Developer's Guide, 12c Release 1 (12.1)", Chapter 23: Database Resident Connection Pooling; Jun. 2014, 6 pages.

United States Patent and Trademark Office, Office Action dated Jun. 27, 2019 for U.S. Appl. No. 15/644,508, 19 Pages.

United States Patent and Trademark Office, Office Action dated Feb. 25, 2019 for U.S. Appl. No. 15/644,502, 11 Pages.

United States Patent and Trademark Office, Office Action dated Feb. 12, 2020 for U.S. Appl. No. 15/644,508, 16 pages.

United States Patent and Trademark Office, Office Action dated Mar. 16, 2020 for U.S. Appl. No. 15/644,504, 29 pages.

United States Patent and Trademark Office, Notice of Allowance dated Apr. 1, 2020 for U.S. Appl. No. 15/644,502, 10 pages.

* cited by examiner

SYSTEM AND METHOD FOR PERFORMING CONNECTION VALIDATION IN A MULTI-TENANT ENVIRONMENT

CLAIM OF PRIORITY

This application claims the benefit of priority to U.S. Provisional Application titled "SYSTEM AND METHOD FOR PERFORMING EFFICIENT CONNECTION VALIDATION IN A MULTI-TENANT ENVIRONMENT", Application No. 62/374,487, filed Aug. 12, 2016, which is herein incorporated by reference.

CROSS-REFERENCE TO RELATED APPLICATIONS

This application is related to U.S. application Ser. No. 15/644,502, titled "SYSTEM AND METHOD FOR SUPPORTING LIVE ADDITION OF A TENANT IN A CONNECTION POOL ENVIRONMENT", filed Jul. 7, 2017; U.S. application Ser. No. 15/644,504, titled "SYSTEM AND METHOD FOR CONTROL OF MAXIMUM CONNECTIONS IN A CONNECTION POOL ENVIRONMENT", filed Jul. 7, 2017; and U.S. application Ser. No. 15/644,508, titled "SYSTEM AND METHOD FOR USE OF SERVER-SIDE CONNECTION POOL TAGGING IN A MULTI-TENANT ENVIRONMENT", filed Jul. 7, 2017; each of which above applications is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to software application servers and databases, and are particularly related to systems and methods for providing access to a database in a multi-tenant environment, including the use of a connection pool, and additional functionalities.

BACKGROUND

Generally described, in a database environment, a connection pool operates as a cache of connection objects, each of which represents a connection that can be used by a software application to connect to a database. At runtime, an application can request a connection from the connection pool. If the connection pool includes a connection that can satisfy the particular request, it can return that connection to the application for its use. In some instances, if no suitable connection is found, then a new connection can be created and returned to the application. The application can borrow the connection to access the database and perform some work, and then return the connection to the pool, where it can then be made available for subsequent connection requests from the same, or from other, applications.

SUMMARY

Described herein are systems and methods for providing access to a database in a multi-tenant environment, including the use of a connection pool, and support for efficient connection validation. For example, the system can support a "seconds to trust idle connection" functionality, which enables lazy validation of connections in the connection pool. The seconds to trust idle connection is the time period, expressed, for example, as a number of seconds, within a particular connection usage, that the connection pool trusts that the connection is still viable, and if so will skip a connection validation test before delivering the connection to a requesting application.

DETAILED DESCRIPTION

As described above, a connection pool operates as a cache of connection objects, each of which represents a connection that can be used by a software application to connect to a database. At runtime, an application can request a connection from the connection pool. If the connection pool includes a connection that can satisfy the particular request, it can return that connection to the application for its use. In some instances, if no suitable connection is found, then a new connection can be created and returned to the application. The application can borrow the connection to access the database and perform some work, and then return the connection to the pool, where it can then be made available for subsequent connection requests from the same, or from other, applications.

Creating connection objects can be costly in terms of time and resources. For example, tasks such as network communication, authentication, transaction enlistment, and memory allocation, all contribute to the amount of time and resources it takes to create a particular connection object. Since connection pools allow the reuse of such connection objects, they help reduce the number of times that the various objects must be created.

One example of a connection pool is Oracle Universal Connection Pool (UCP), which provides a connection pool for caching Java Database Connectivity (JDBC) connections. For example, the connection pool can operate with a JDBC driver to create connections to a database, which are then maintained by the pool; and can be configured with properties that are used to further optimize pool behavior, based on the performance and availability requirements of a requesting software application.

Connection Labeling

Figure 1:
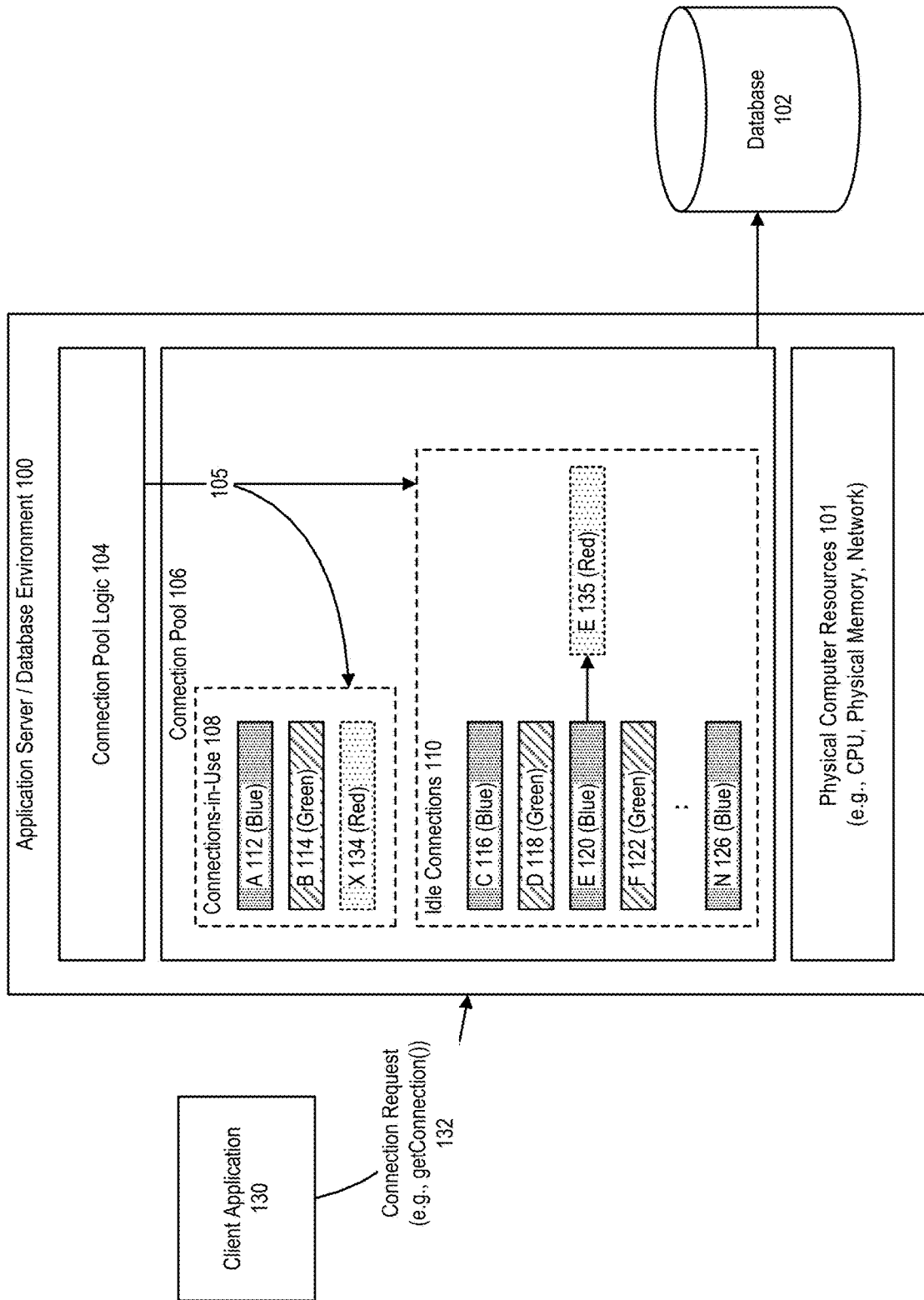
FIG. 1 illustrates a system that includes a connection pool, in accordance with an embodiment.

FIG. 1 illustrates a system that includes a connection pool, in accordance with an embodiment.

As illustrated in FIG. 1, in accordance with an embodiment, an application server or database environment 100, which includes physical computer resources 101 (e.g., a processor/CPU, memory, and network components), for example an Oracle WebLogic Server, Oracle Fusion Middleware, or other application server or database environment, can include or provide access to a database 102, for example an Oracle database, or other type of database.

As further illustrated in FIG. 1, in accordance with an embodiment, the system also includes a connection pool logic 104 or program code, which when executed by a computer controls 105 the creation and use of connection objects in a connection pool 106, including, for example, connections that are currently in use 108 by a software application, and connections that are idle 110, or are not currently being used.

Software applications can initialize connections retrieved from a connection pool, before using the connection to access, or perform work at the database. Examples of initialization can include simple state re-initializations that require method calls within the application code, or more complex initializations including database operations that require round trips over a network. The computational cost of these latter types of initialization may be significant.

Some connection pools (for example, UCP) allow their connection pools to be configured using connection pool properties, that have get and set methods, and that are available through a pool-enabled data source instance. These get and set methods provide a convenient way to programmatically configure a pool. If no pool properties are set, then a connection pool uses default property values.

In accordance with an embodiment, labeling connections allows a client software application to attach arbitrary name/value pairs to a connection. The application can then request a connection with a desired label from the connection pool. By associating particular labels with particular connection states, an application can potentially retrieve an already-initialized connection from the pool, and avoid the time and cost of re-initialization. Connection labeling does not impose any meaning on user-defined keys or values; the meaning of any user-defined keys and values is defined solely by the application.

For example, as illustrated in FIG. 1, in accordance with an embodiment, the connection pool can include a plurality of connections that are currently in use by software applications, here indicated as connections A 112 and B 114. Each of the connections can be labeled, for example connection A is labeled (Blue) and connection B is labeled (Green). These labels/colors are provided for purposes of illustration, and as described above can be arbitrary name/value pairs attached to a connection by a client application. In accordance with various embodiments, different types of labels can be used, to distinguish between different connection types; and different applications can attach different labels/colors to a particular connection type.

As further illustrated in FIG. 1, in accordance with an embodiment, the connection pool can also include a plurality of connections that are idle, or are not currently being used by software applications, here indicated as connections C 116, D 118, E 120, F 122, G 124 and N 126. Each of the idle connections can be similarly labeled, in this illustration as (Blue) or (Green), and again these labels/colors are provided for purposes of illustration.

As further illustrated in FIG. 1, in accordance with an embodiment, if a software application 130 wishes to make a request on the database, using a particular type of connection, for example a (Red) connection, then the application can make a "getConnection(Red)" request 132. In response, the connection pool logic will either create a new (Red) connection, here indicated as X 134 (Red); or repurpose an existing idle connection from (Blue or Green) to (Red), here indicated as E 135 (Red).

Sharded Databases

In accordance with an embodiment, sharding is a database-scaling technique which uses a horizontal partitioning of data across multiple independent physical databases. The part of the data which is stored in each physical database is referred to as a shard. From the perspective of a software client application, the collection of all of the physical databases appears as a single logical database.

In accordance with an embodiment, the system can include support for use of a connection pool with sharded databases. A shard director or listener provides access by software client applications to database shards. A connection pool (e.g., UCP) and database driver (e.g., a JDBC driver) can be configured to allow a client application to provide a shard key, either during connection checkout or at a later time; recognize shard keys specified by the client application; and enable connection by the client application to a particular shard or chunk. The approach enables efficient re-use of connection resources, and faster access to appropriate shards.

Figure 2:
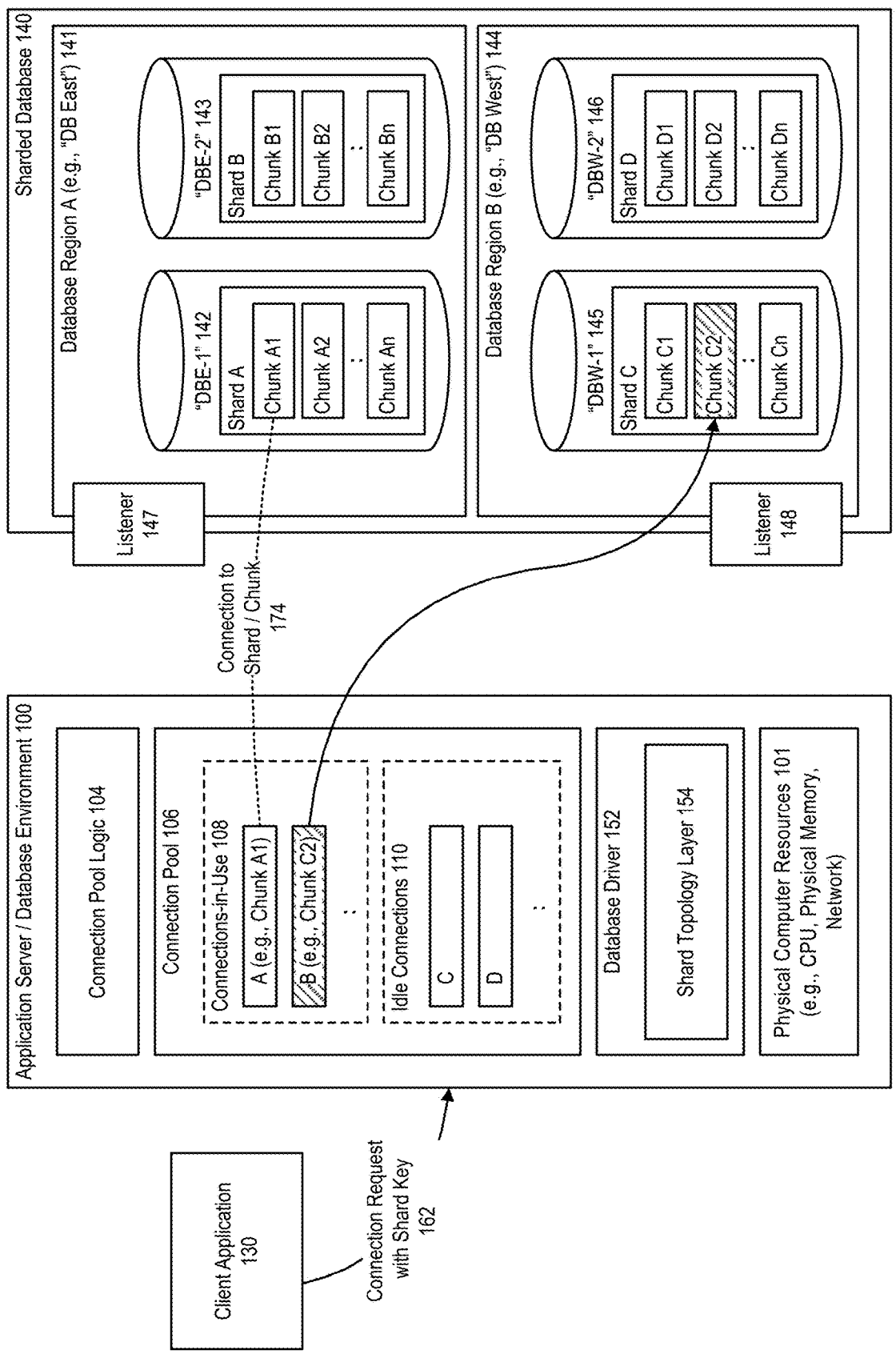
FIG. 2 further illustrates a system that includes a connection pool, including support for use of a sharded database, in accordance with an embodiment.

FIG. 2 further illustrates a system that includes a connection pool, including support for use of a sharded database, in accordance with an embodiment.

In accordance with an embodiment, a database table can be partitioned using a shard key (SHARD_KEY), for example as one or more columns that determine, within a particular shard, where each row is stored. A shard key can be provided in a connect string or description as an attribute of connect data (CONNECT_DATA). Examples of shard keys can include a VARCHAR2, CHAR, DATE, NUMBER, or TIMESTAMP in the database. In accordance with an embodiment, a sharded database can also accept connections without a shard key or shard group key.

In accordance with an embodiment, to reduce the impact of resharding on system performance and data availability, each shard can be subdivided into smaller pieces or chunks. Each chunk acts as a unit of resharding that can be moved from one shard to another. Chunks also simplify routing, by adding a level of indirection to the shard key mapping.

For example, each chunk can be automatically associated with a range of shard key values. A user-provided shard key can be mapped to a particular chunk, and that chunk mapped to a particular shard. If a database operation attempts to operate on a chunk that is not existent on a particular shard, then an error will be raised. When shard groups are used, each shard group is a collection of those chunks that have a specific value of shard group identifier.

A shard-aware client application can work with sharded database configurations, including the ability to connect to one or multiple database shards in which the data is partitioned based on one or more sharding methods. Each time a database operation is required, the client application can determine the shard to which it needs to connect.

In accordance with an embodiment, a sharding method can be used to map shard key values to individual shards. Different sharding methods can be supported, for example: hash-based sharding, in which a range of hash values is assigned to each chunk, so that upon establishing a database connection the system applies a hash function to a given value of the sharding key, and calculates a corresponding hash value which is then mapped to a chunk based on the range to which that value belongs; range-based sharding, in which a range of shard key values is assigned directly to individual shards; and list-based sharding, in which each shard is associated with a list of shard key values.

As illustrated in FIG. 2, in accordance with an embodiment a sharded database 140 can comprise a first database region A (here indicated as "DB East", DBE) 141, including sharded database instances "DBE-1" 142, with a shard A stored as chunks A1, A2, . . . An; and "DBE-2" 143, with a shard B stored as chunks B1, B2, . . . Bn.

As further illustrated in FIG. 2, in accordance with an embodiment, a second database region B (here indicated as "DB West", DBW) 144, includes sharded database instances "DBW-1" 145, with a shard C stored as chunks C1, C2, . . . Cn; and "DBW-2" 146, with a shard D stored as chunks D1, D2, . . . Dn.

In accordance with an embodiment, each database region or group of sharded database instances can be associated with a shard director or listener (e.g., an Oracle Global Service Managers (GSM) listener, or another type of listener). For example, as illustrated in FIG. 2, a shard director or listener 147 can be associated with the first database region A; and another shard director or listener 148 can be associated with the second database region B. The system can include a database driver (e.g., a JDBC driver) 152 that maintains a shard topology layer 154, which over a period of time learns and caches shard key ranges to the location of each shard in a sharded database.

In accordance with an embodiment, a client application can provide one or more shard keys to the connection pool during a connection request 162; and, based on the one or more shard keys, and information provided by the shard topology layer, the connection pool can route the connection request to a correct or appropriate shard.

In accordance with an embodiment, the connection pool can also identify a connection to a particular shard or chunk by its shard keys, and allow re-use of a connection when a request for a same shard key is received from a particular client application.

For example, as illustrated in FIG. 2, in accordance with an embodiment, a connection to a particular chunk (e.g., chunk A1) can be used to connect 174, to that chunk. If there are no available connections in the pool to the particular shard or chunk, the system can attempt to repurpose an existing available connection to another shard or chunk, and re-use that connection. The data distribution across the shards and chunks in the database can be made transparent to the client application, which also minimizes the impact of re-sharding of chunks on the client.

When a shard-aware client application provides one or more shard keys to the connection pool, in association with a connection request; then, if the connection pool or database driver already has a mapping for the shard keys, the connection request can be directly forwarded to the appropriate shard and chunk, in this example, to chunk C2.

When a shard-aware client application does not provide a shard key in association with the connection request; or if the connection pool or database driver does not have a mapping for a provided shard key; then the connection request can be forwarded to an appropriate shard director or listener.

Multi-Tenant Environments

In accordance with an embodiment, the system can include support for cloud-based or multi-tenant environments using connection labeling. For example, a multi-tenant cloud environment can include an application server or database environment that includes or provides access to a database for use by multiple tenants or tenant applications, in a cloud-based environment.

Figure 3:
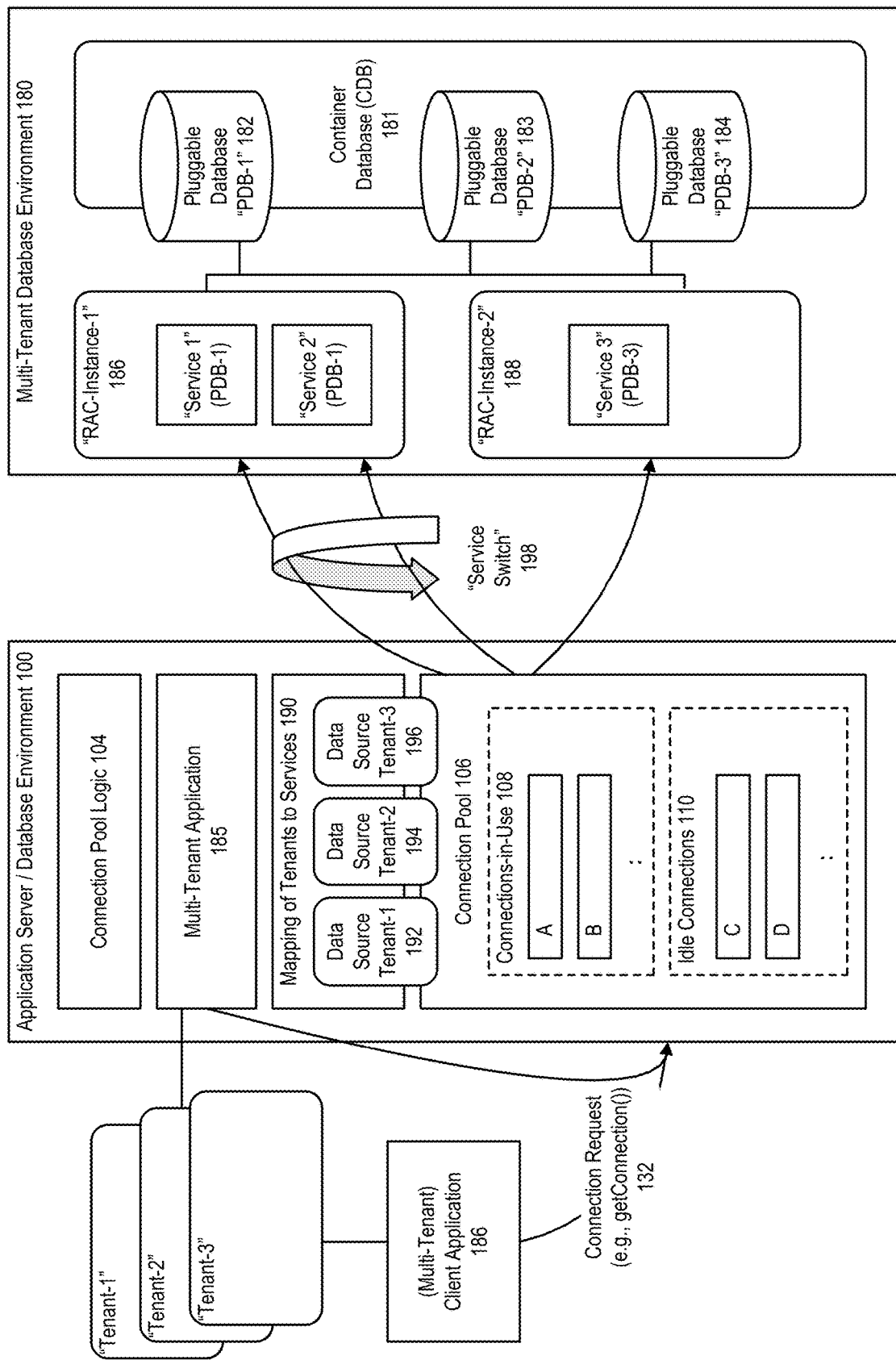
FIG. 3 further illustrates a system that includes a connection pool, including support for use in a multi-tenant environment, in accordance with an embodiment.

FIG. 3 further illustrates a system that includes a connection pool, including support for use in a multi-tenant environment, in accordance with an embodiment.

Software applications, which can be accessed by tenants via a cloud or other network, may, similarly to the environments described above, initialize connections retrieved from a connection pool before using the connection.

As described above, examples of initialization can include simple state re-initializations that require method calls within the application code, or more complex initializations including database operations that require round trips over a network.

As also described above, labeling connections allows an application to attach arbitrary name/value pairs to a connection, so that the application can then request a connection with a desired label from the connection pool, including the ability to retrieve an already-initialized connection from the pool and avoid the time and cost of re-initialization.

As illustrated in FIG. 3, in accordance with an embodiment, a multi-tenant database environment 180 can include, for example, a container database (CDB) 181, and one or more pluggable database (PDB), here illustrated as "PDB-1" 182, "PDB-2" 183, and "PDB-3" 184.

In accordance with an embodiment, each PDB can be associated with a tenant, here illustrated as "Tenant-1", "Tenant-2", and "Tenant-3", of a multi-tenant application that is either hosted by the application server or database environment 185, or provided as an external client application 186, and which provides access to the database environment through the use of one or more Oracle Real Application Cluster (RAC) instances 186, 188, including in this example "RAC-Instance-1", and "RAC-Instance-2"; one or more services, including in this example Service-1", "Service-2", and "Service-3", and a mapping of tenants to services 190.

In the example illustrated in FIG. 3, an application being used by a tenant to access the database environment, can make connection requests associated with that tenant's data source 192, 194, 196, and the system can switch services 198 if necessary, to utilize connections to existing RAC instances or PDBs.

Server-Side Connection Pools

In accordance with an embodiment, the system can utilize a server-side connection pool tagging feature, such as that provided, for example, by Oracle Database Resident Connection Pooling (DROP). A server-side connection pool tagging feature allows user applications or clients to selectively obtain a connection to a database environment, based on use of a single tag that is understood by that database environment.

In accordance with an embodiment, only one tag is associated per connection. The database server does not communicate the tag value to the user applications or clients, but rather communicates a tag-match (for example, as a Boolean value).

Efficient Connection Validation in the Pool

In accordance with an embodiment, the system can include support for efficient connection validation.

For example, the system can support a "seconds to trust idle connection" functionality, which enables lazy validation of connections in the connection pool. The seconds to trust idle connection is the time period, expressed, for example, as a number of seconds, within a particular connection usage, that the connection pool trusts that the connection is still viable, and if so will skip a connection validation test before delivering the connection to a requesting application.

Generally, connection pools have a mechanism to validate a connection when the connection is borrowed. The validation process may be turned on by default, to prevent runtime errors from arising; and typically requires a roundtrip to the database in order to validate or test the connection. The process is computationally expensive, because it requires a roundtrip to the database, but it improves overall confidence in the connection being connected to the database.

In accordance with an embodiment, the "seconds to trust idle connection" functionality allows a lazy validation of connections in the connection pool; by indicating the number of seconds within a connection usage that the pool trusts that the connection is still viable, and if so, the pool will skip the connection validation test, before delivering the connection to an application.

For example, in accordance with an embodiment, the system can instruct the connection pool environment, that it does not need to validate or test a borrowed connection, if the connection was last used within, e.g., X seconds. In such an example, the connection pool only validates or tests the borrowed connection if the connection was last used greater than X seconds ago.

This provides a performance enhancement in the connection pool, especially during instances of peak traffic, by reducing the impact of connection testing.

For example, on a connection borrow request from an application, the connection pool environment can check the last validated time stamp of the connection (i.e., the last time the connection was successfully used), and, if the difference of current time and last validated time is greater than the seconds to trust idle connection, then the pool again validates the connection; or otherwise the pool trusts that the connection is still usable, without checking validity.

Figure 4:
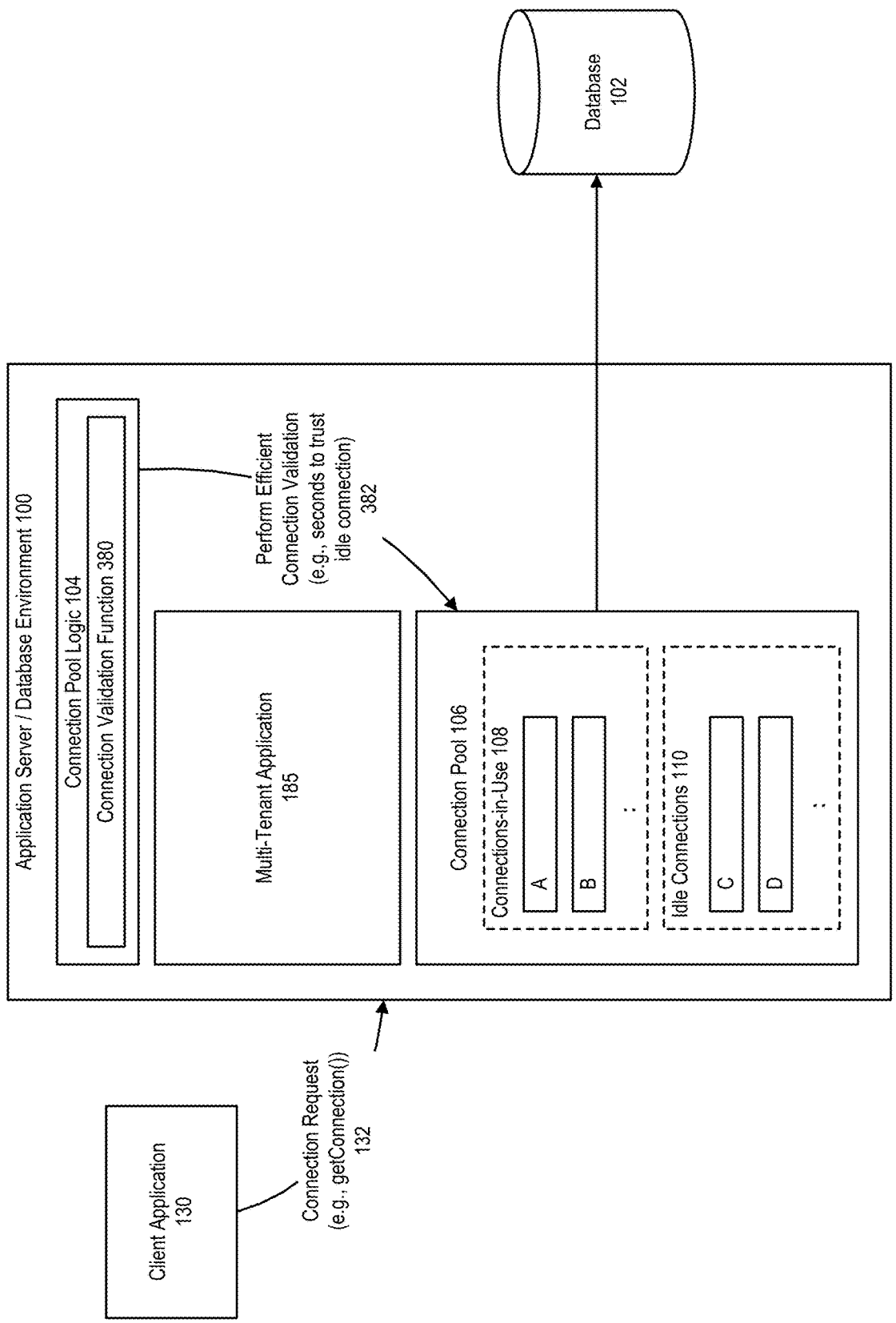
FIG. 4 illustrates an embodiment which supports connection validation, in a connection pool environment.

FIG. 4 illustrates an embodiment which supports connection validation, in a connection pool environment.

As illustrated in FIG. 4, in accordance with an embodiment, a connection validation function 380 can be used by the connection pool to perform connection validation 382.

In accordance with an embodiment, the connection validation function can improve efficiency of connection validation by selectively validating connections, instead of validating each connection that is to be borrowed, thereby improving validation efficiency.

In accordance with an embodiment, to validate a connection, the connection pool can execute a SQL statement on the connection, or perform an internal ping if a JDBC driver is used.

In accordance with an embodiment, the connection validation feature can be configured using a plurality of properties on the connection pool, or programmatically using a connection validation interface.

For example, the following properties on the connection pool can be used to configure the connection validation feature:

setValidateConnectionOnBorrow(Boolean): Specifies whether or not connections are validated when the connection is borrowed from the connection pool. The method enables validation for every connection that is borrowed from the pool. A value of false means no validation is performed. The default value is false.

setSQLForValidateConnection(String): Specifies the SQL statement that is executed on a connection when it is borrowed from the pool.

The following example demonstrates validating a connection when the connection is borrowed from the connection pool. The example uses Connector/J JDBC driver from MySQL.

PoolDataSource
  pds=PoolDataSourceFactory.getPoolDataSource( );
pds.setConnectionFactoryClassName
  ("com.mysql.jdbc.jdbc2.optional.
MysqlDataSource");
pds.setURL ("jdbc:mysql://host:3306/mysql");
pds.setUser ("<user>");
pds.setPassword ("<password>");
pds.setValidateConnectionOnBorrow(true);
pds.setSQLForValidateConnection     ("select*from mysql.user");
Connection conn=pds.getConnectionQ;

In accordance with an embodiment, when a JDBC driver (e.g., Oracle JDBC driver) is used, the setValidateConnectionOnBorrow property can be set to true, and the setSQLForValidateConnection property is not used. Such configuration can enable the connection pool to perform an internal ping, which is faster than executing an SQL statement.

Further, the connection validation feature can be configured using a connection validation interface, for example, the oracle.ucp.jdbc.ValidConnection interface that includes an "isValid" method and a 'setInvalid' method. The "isValid" method can return information indicating whether or not a connection is usable and the "setInvalid" method can be used to indicate that a connection should be removed from the connection pool instance.

In accordance with an embodiment, in the above example, the "isValid method" can be used to check if a connection is still usable after an SQL exception has been thrown. The method can be used anytime to check if a borrowed connection is valid. The method is particularly useful in combination with a retry mechanism, such as the Fast Connection Failover actions that are triggered after a down event of Oracle RAC.

In accordance with an embodiment, the "isValid" method can check with the connection pool instance and a database driver (e.g., Oracle JDBC driver) to determine whether a connection is still valid. The "isValid" method can result in a round-trip to the database only if both the connection pool instance and the database driver report that a connection is still valid. The round-trip is used to check for database failures that are not immediately discovered by the pool or the driver.

In accordance with an embodiment, the "isValid" method can be used in conjunction with the connection timeout and connection harvesting features. These features may return a connection to the connection pool while the connection is being held by an application. In such cases, the "isValid" method returns false, allowing the application to get a new connection.

Regardless of how the connection validation feature is configured, the connection validation feature can ensure that a connection is valid before the connection pool hands the connection to the client application 130. Without the connection validation feature, a borrowed connection may be invalid, for example, in case of network outage and server crash, and runtime errors caused by the invalid connection may be hard to debug.

However, the connection validation feature can generate a large of amount of traffic, thereby slowing down application performance. The connection validation function 380 can be used by the connection pool to improve application performance by minimize the impact of frequent connection validation.

Figure 5:
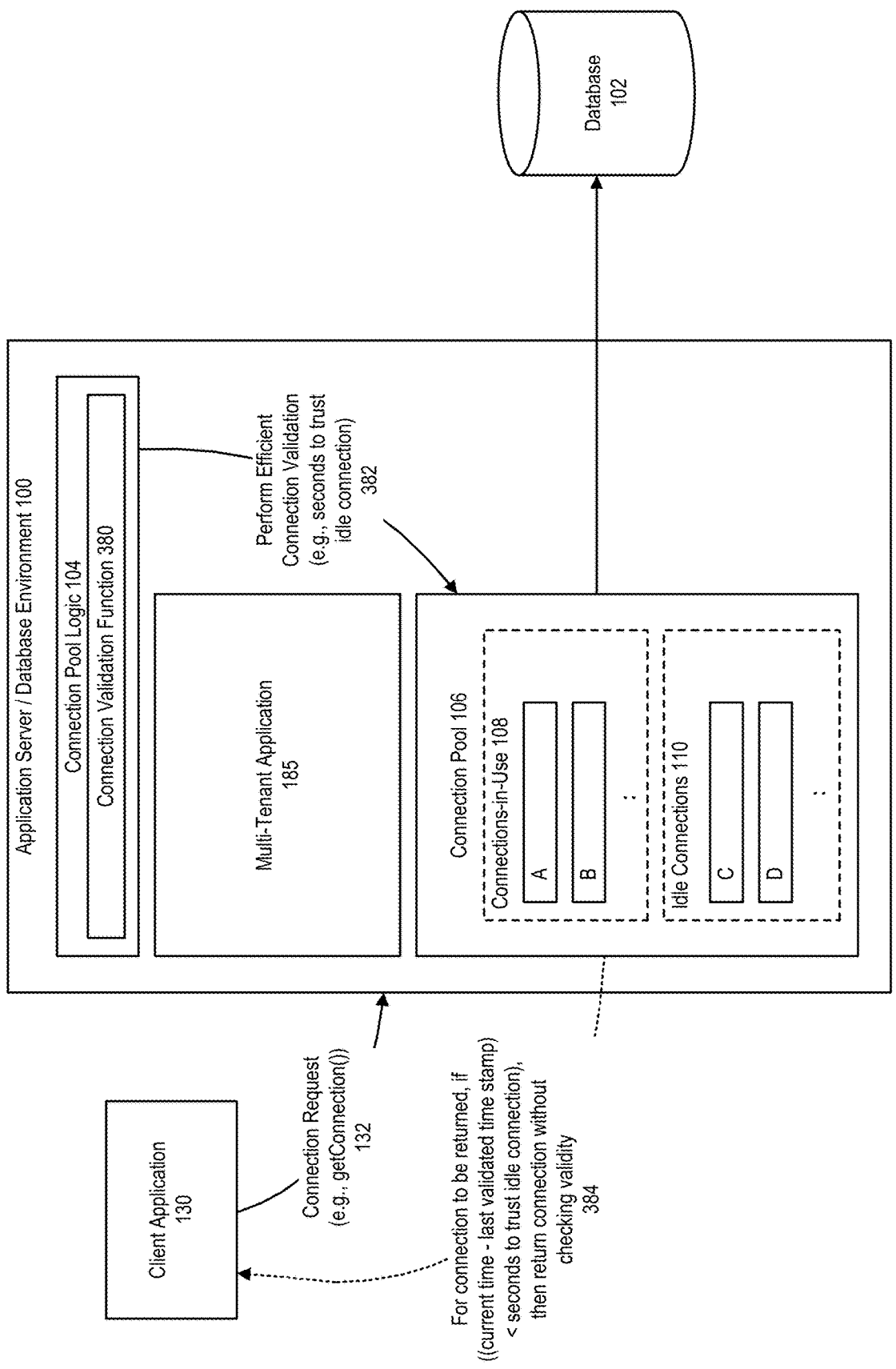
FIG. 5 further illustrates an embodiment which supports connection validation, in a connection pool environment.

FIG. 5 further illustrates an embodiment which supports connection validation, in a connection pool environment.

As illustrated in FIG. 5, in accordance with an embodiment, the system determines 384, for a connection to be returned, if the (difference between the current time and the last validated time stamp) is less than the seconds to trust idle connection value, and if so then the connection is returned without checking validity.

In accordance with an embodiment, the system can enable the connection to skip validating those connections that have been recently used within a configurable period of time. System performance can be improved due to the less amount of traffic generated in validating the connections.

In one use case, for example, the connection pool may can reuse a short list of connections to keep the cache hot, whereas the rest of the connections (less frequently used connections) may be maintained in the connection pool for peak usage.

In accordance with an embodiment, the seconds to trust idle connection value can be set, so that the less frequently connections can be validated.

For example, the connections in the connection pool may need to pass through a firewall to connect to the database. The firewall may have a timeout setting that can drop the one or more two connections. One or more of the less frequently connections may be idle for a period of time that exceeds the firewall timeout period.

In accordance with an embodiment, in the above example, if the seconds to trust idle connection value is set based on the firewall timeout period, the connection pool can be configured to detect a connection dropped by the firewall.

Figure 6:
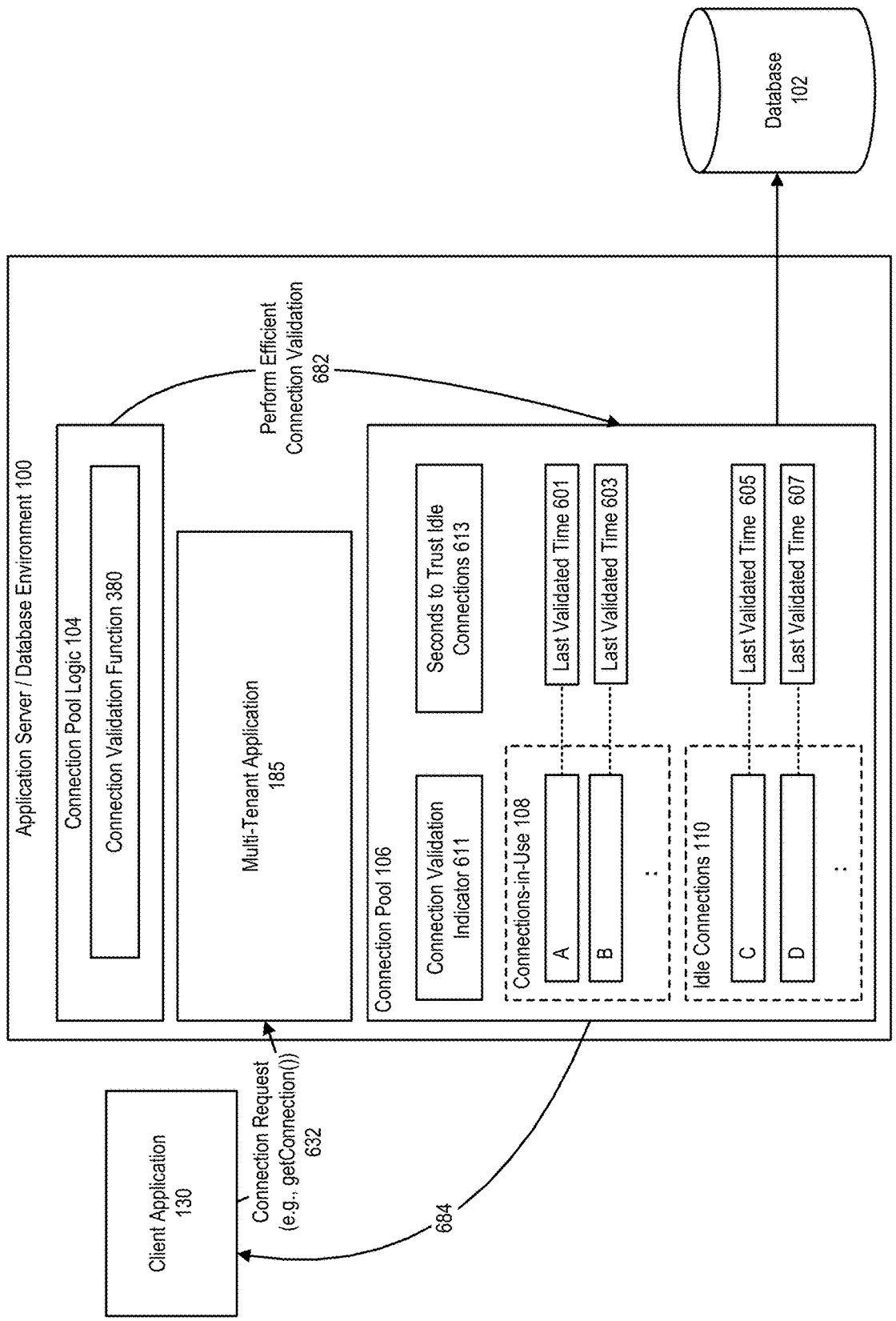
FIG. 6 further illustrates an embodiment which supports connection validation, in a connection pool environment.

FIG. 6 further illustrates an embodiment which supports connection validation, in a connection pool environment.

As shown in FIG. 6, in accordance with an embodiment, the connection pool can include a connection validation indicator 611, a seconds to trust Idle connections value 613, and a last validated time 601, 603, 605, 607 for each of the plurality of connections in the connection pool.

In accordance with an embodiment, the connection validation indicator can be set by a method that takes a Boolean value as a parameter, for example, setValidateConnectionOnBorrow(Boolean). When the method is set to true, each connection in the connection pool is validated during the checkout. As mentioned above, this validation may incur significant overhead in applications that checkout database connections frequently.

In accordance with an embodiment, the seconds to trust idle connections value can be set by a method that takes an integer as a parameter, for example, setSecondsToTrustIdleConnection(int); and can be used to minimize the impact of frequent connection validation. When the seconds to trust idle connections value is set appropriately, connections that are recently used or recently validated/tested can be trusted, and are not to be validated during their checkout. Thus, the time to trust parameter can be used to skip testing connections and improve application performance.

In accordance with an embodiment, if the seconds to trust idle connections value is set to positive, the connection validation is skipped for connections that were used within the time specified by the seconds to trust idle connections value, for example, 5 seconds. The default seconds to trust idle connections value is set to 0, which can indicate that the connection validation feature is disabled.

In accordance with an embodiment, the seconds to trust idle connections value can enable the connection pool to skip the validation test on connections only if the connection validation indicator is set to true. If the seconds to trust idle connections value is set to positive without setting the connection validation indicator to true, the connection pool can throw an exception indicating that the seconds to trust idle connections value is invalid.

As an illustrative example, when the client application requests 632 a connection from the connection pool, the connection pool can check the last validated time stamp of the connection (i.e., the last time the connection was successfully used), and, if the difference of current time and last validated time is greater than the seconds to trust idle connection, then the pool again validates the connection; or otherwise the pool trusts that the connection is still usable, without checking validity, and return 684 the connection to the client application.

Figure 7:
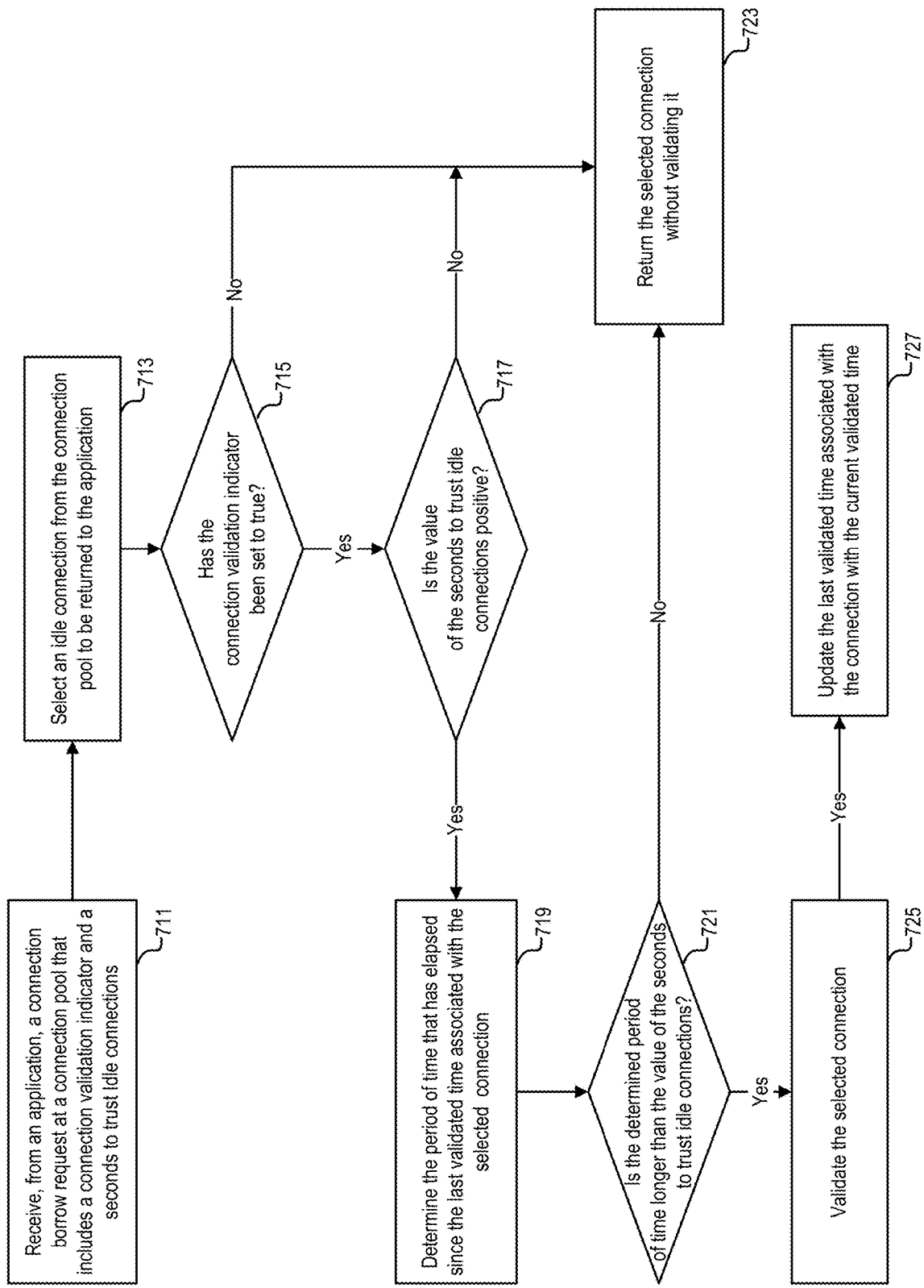
FIG. 7 illustrates a process for providing connection validation, in accordance with an embodiment.

FIG. 7 illustrates a process for providing connection validation, in accordance with an embodiment.

As shown in FIG. 7, at step 711, a connection borrow request from an application is received at a connection pool that includes a connection validation indicator and a seconds to trust Idle connections.

At step 713, in response to the connection borrow request, the connection pool selects an idle connection from the connection pool to be returned to the application.

At step 715, the connection pool determines whether the connection validation indicator has been set to true or not. If the connection validation indicator has not been set to true, the connection pool returns the selected connection without validating the connection as shown at step 723.

At step 717, after determining that the connection validation indicator has been set to true, the connection pool further determines whether the value of the seconds to trust idle connections is positive. If not, the connection pool return the selected connection without validating it.

At step 719, after determining that the value of the seconds to trust idle connections is positive, the connection pool further determines the period of time that has elapsed since the last validated time associated with the selected connection.

At step 721, the connection pool determines whether the period of time that has elapsed since the last validated time associated with the selected connection is longer than the value of the seconds to trust idle connections. If it is not longer than the value of the seconds to trust idle connections, the connection pool can return the selected connection without validating it, as shown at step 723.

At step 725, in response to determining that the period of time that has elapsed is longer than the value of the seconds to trust idle connections, the connection pool validates the selected connection by either executing a SQL statement on the connection, or performing an internal ping.

At step 727, the connection pool updates the last validated time associated with the connection, with the time when the connection is validated as described at step 725.

Figure 8:
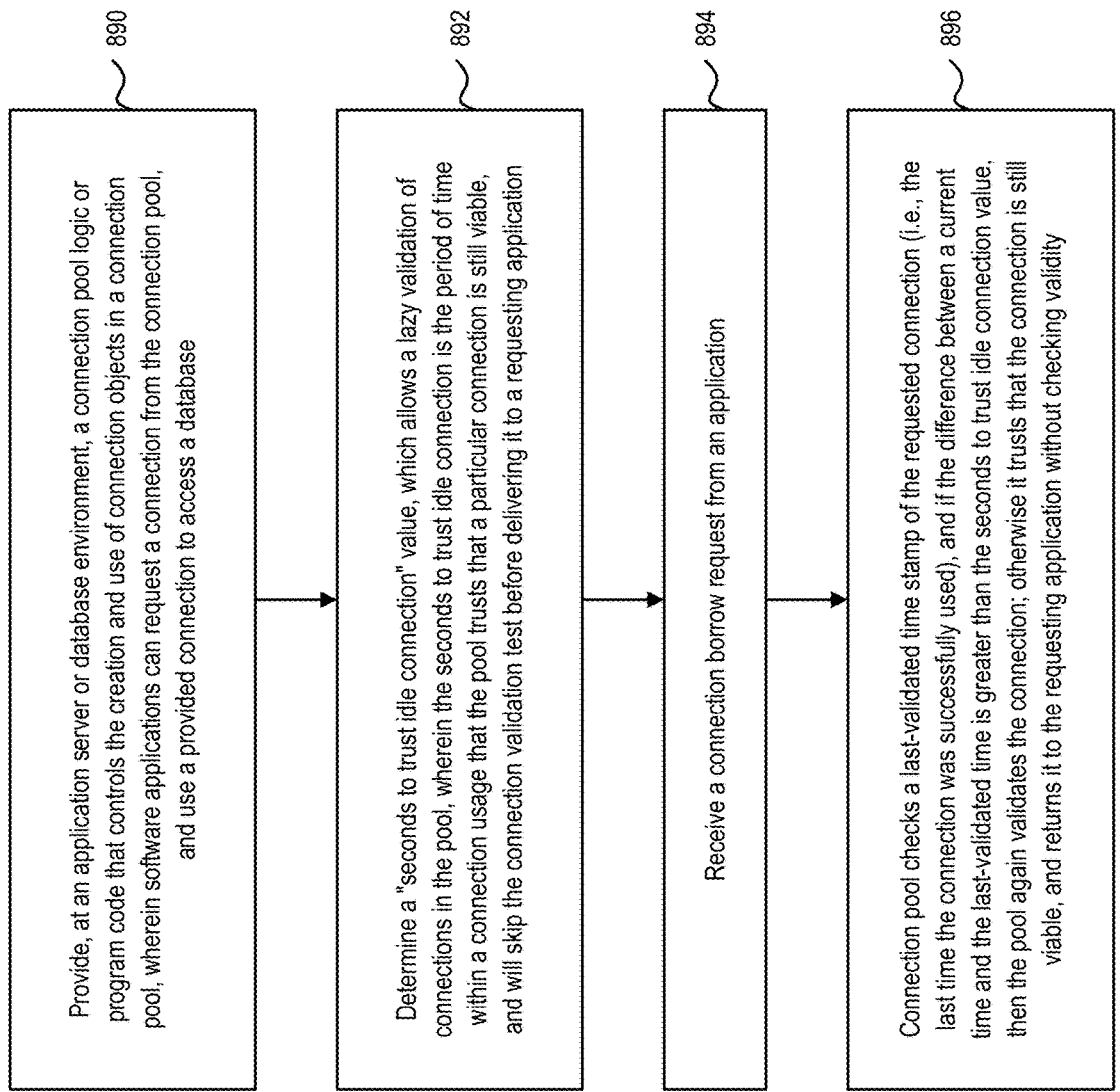
FIG. 8 illustrates a method of providing connection validation, in a connection pool environment, in accordance with an embodiment.

FIG. 8 illustrates a method of providing connection validation, in a connection pool environment, in accordance with an embodiment.

As illustrated in FIG. 8, at step 890, at an application server or database environment, a connection pool logic or program code is provided that controls the creation and use of connection objects in a connection pool, wherein software applications can request a connection from the connection pool, and use a provided connection to access a database.

At step 892, the system determines a "seconds to trust idle connection" value, which allows a lazy validation of connections in the pool, wherein the seconds to trust idle connection is the period of time within a connection usage that the pool trusts that a particular connection is still viable, and will skip the connection validation test before delivering it to a requesting application.

At step 894, a connection borrow request is received from an application.

At step 896, the connection pool checks a last-validated time stamp of the requested connection (i.e., the last time the connection was successfully used), and if the difference between a current time and the last-validated time is greater than the seconds to trust idle connection value, then the pool again validates the connection; otherwise it trusts that the connection is still viable, and returns it to the requesting application without checking validity.

While various embodiments of the present invention have been described above, it should be understood that they have been presented by way of example, and not limitation. The embodiments were chosen and described in order to explain the principles of the invention and its practical application. The embodiments illustrate systems and methods in which the present invention is utilized to improve the performance of the systems and methods by providing new and/or improved features and/or providing benefits such as reduced resource utilization, increased capacity, improved efficiency, and reduced latency.

In some embodiments, features of the present invention are implemented, in whole or in part, in a computer including a processor, a storage medium such as a memory and a network card for communicating with other computers. In some embodiments, features of the invention are implemented in a distributed computing environment in which one or more clusters of computers is connected by a network such as a Local Area Network (LAN), switch fabric network (e.g. InfiniBand), or Wide Area Network (WAN). The distributed computing environment can have all computers at a single location or have clusters of computers at different remote geographic locations connected by a WAN.

In some embodiments, features of the present invention are implemented, in whole or in part, in the cloud as part of, or as a service of, a cloud computing system based on shared, elastic resources delivered to users in a self-service, metered manner using Web technologies. There are five characteristics of the cloud (as defined by the National Institute of Standards and Technology: on-demand self-service; broad network access; resource pooling; rapid elasticity; and measured service. See, e.g. "The NIST Definition of Cloud Computing", Special Publication 800-145 (2011) which is incorporated herein by reference. Cloud deployment models include: Public, Private, and Hybrid. Cloud service models include Software as a Service (SaaS), Platform as a Service (PaaS), Database as a Service (DBaaS), and Infrastructure as a Service (IaaS). As used herein, the cloud is the combination of hardware, software, network, and web technologies which delivers shared elastic resources to users in a self-service, metered manner. Unless otherwise specified the cloud, as used herein, encompasses public cloud, private cloud, and hybrid cloud embodiments, and all cloud deployment models including, but not limited to, cloud SaaS, cloud DBaaS, cloud PaaS, and cloud IaaS.

In some embodiments, features of the present invention are implemented using, or with the assistance of hardware, software, firmware, or combinations thereof. In some embodiments, features of the present invention are implemented using a processor configured or programmed to execute one or more functions of the present invention. The processor is in some embodiments a single or multi-chip processor, a digital signal processor (DSP), a system on a chip (SOC), an application specific integrated circuit (ASIC), a field programmable gate array (FPGA) or other programmable logic device, state machine, discrete gate or transistor logic, discrete hardware components, or any combination thereof designed to perform the functions described herein. In some implementations, features of the present invention may be implemented by circuitry that is specific to a given function. In other implementations, the features may implemented in a processor configured to perform particular functions using instructions stored e.g. on a computer readable storage media.

In some embodiments, features of the present invention are incorporated in software and/or firmware for controlling the hardware of a processing and/or networking system, and for enabling a processor and/or network to interact with other systems utilizing the features of the present invention. Such software or firmware may include, but is not limited to, application code, device drivers, operating systems, virtual machines, hypervisors, application programming interfaces, programming languages, and execution environments/containers. Appropriate software coding can readily be prepared by skilled programmers based on the teachings of the present disclosure, as will be apparent to those skilled in the software art.

In some embodiments, the present invention includes a computer program product which is a storage medium or computer-readable medium (media) having instructions stored thereon/in, which instructions can be used to program or otherwise configure a system such as a computer to perform any of the processes or functions of the present invention. The storage medium or computer-readable medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. In particular embodiments, the storage medium or computer-readable medium is a non-transitory storage medium or non-transitory computer readable medium.

The foregoing description is not intended to be exhaustive or to limit the invention to the precise forms disclosed. Additionally, where embodiments of the present invention have been described using a particular series of transactions and steps, it should be apparent to those skilled in the art that the scope of the present invention is not limited to the described series of transactions and steps. Further, where embodiments of the present invention have been described using a particular combination of hardware and software, it should be recognized that other combinations of hardware and software are also within the scope of the present invention. Further, while the various embodiments describe particular combinations of features of the invention it should be understood that different combinations of the features will be apparent to persons skilled in the relevant art as within the scope of the invention such that features of one embodiment may incorporated into another embodiment. Moreover, it will be apparent to persons skilled in the relevant art that various additions, subtractions, deletions, variations, and other modifications and changes in form, detail, implementation and application can be made therein without departing from the spirit and scope of the invention.

It is intended that the broader spirit and scope of the invention be defined by the following claims and their equivalents.

What is claimed is:

1. A system for providing access to a database in a multi-tenant environment, including support for connection validation, comprising:
a computer including a processor;
wherein the computer controls creation and use of connection objects in a connection pool that enables software applications to request connections from the connection pool, and use a provided connection to access a database; and
wherein the system selectively performs connection validation in the connection pool, including wherein upon receipt of a connection request from an application, the connection pool:
determines a connection to be returned to the application;
checks a last validated timestamp associated with the connection and indicative of a last time the connection was successfully used; and
if a difference between a current time and the last validated timestamp is greater than a time to trust idle connection value determined based on a particular connection usage,
then the pool validates the connection and returns the connection to the client application in response to the connection request;
else the connection is returned to the client application in response to the connection request without checking validity of the connection.

2. The system of claim 1, further comprising: wherein the system comprises functionality for connection validation in the connection pool, including determination of a seconds to trust idle connection time period, within a particular connection usage, that the connection pool trusts that the connection is still viable, and if so then skipping a connection validation test before delivering the connection to a requesting application.

3. The system of claim 1, wherein the connection pool environment checks the last validated timestamp of the connection, to determine whether to trust an idle connection.

4. The system of claim 1, wherein the connection pool environment checks the last validated timestamp of the connection, and, if the difference of current time and last validated time is greater than the seconds to trust idle connection, then the pool again validates the connection; or otherwise the connection pool trusts that the connection is still usable, without checking validity.

5. The system of claim 1, wherein the connection pool is configured that it does not need to test a borrowed connection, if the connection was last used within a particular amount of time.

6. The system of claim 1, wherein the connection validation test is performed by the connection pool that executes a SQL statement on a connection, or performs an internal ping if a JDBC driver is used.

7. A method for providing access to a database in a multi-tenant environment, including support for connection validation, comprising:
providing, at a computer including a processor, a connection pool that includes connection objects and that enables software applications to request connections from the connection pool, and use a provided connection to access a database; and
performing connection validation in the connection pool selectively, including:
receiving a connection request from an application;
determining a connection to be returned to the application;
checking a last validated timestamp associated with the connection and indicative of a last time the connection was successfully used, and
if a difference between a current time and the last validated timestamp is greater than a time to trust idle connection value determined based on a particular connection usage,
then validating the connection and returning the connection to the client application in response to the connection request;
else returning the connection to the client application in response to the connection request without checking validity of the connection.

8. The method of claim 7, further comprising: performing connection validation in the connection pool, including determining a seconds to trust idle connection time period, within a particular connection usage, that the connection pool trusts that the connection is still viable, and if set, then skipping a connection validation test before delivering the connection to a requesting application.

9. The method of claim 7, wherein the connection pool environment checks the last validated timestamp of the connection, to determine whether to trust an idle connection.

10. The method of claim 7, wherein the connection pool environment checks the last validated timestamp of the connection, and, if the difference of current time and last validated time is greater than the seconds to trust idle connection, then the pool again validates the connection; or otherwise the connection pool trusts that the connection is still usable, without checking validity.

11. The method of claim 7, wherein the connection pool is configured that it does not need to test a borrowed connection, if the connection was last used within a particular amount of time.

12. The method of claim 7, wherein the connection validation test is performed by the connection pool that executes a SQL statement on a connection, or performs an internal ping if a JDBC driver is used.

13. A non-transitory computer readable storage medium, including instructions stored thereon which when read and executed by one or more computers cause the one or more computers to perform the method comprising:
providing, at a computer including a processor, a connection pool that includes connection objects and that enables software applications to request connections from the connection pool, and use a provided connection to access a database; and
performing connection validation in the connection pool selectively, including:
receiving a connection request from an application;
determining a connection to be returned to the application;
checking a last validated timestamp associated with the connection and indicative of a last time the connection was successfully used, and
if a difference between a current time and the last validated timestamp is greater than a time to trust idle connection value determined based on a particular connection usage,
then validating the connection and returning the connection to the client application in response to the connection request;

else returning the connection to the client application in response to the connection request without checking validity of the connection.

14. The non-transitory computer readable storage medium of claim 13, further comprising: performing connection validation in the connection pool, including determining a seconds to trust idle connection time period, within a particular connection usage, that the connection pool trusts that the connection is still viable, and if set, then skipping a connection validation test before delivering the connection to a requesting application.

15. The non-transitory computer readable storage medium of claim 13, wherein the connection pool environment checks the last validated timestamp of the connection, to determine whether to trust an idle connection.

16. The non-transitory computer readable storage medium of claim 13, wherein the connection pool environment checks the last validated timestamp of the connection, and, if the difference of current time and last validated time is greater than the seconds to trust idle connection, then the pool again validates the connection; or otherwise the connection pool trusts that the connection is still usable, without checking validity.

17. The non-transitory computer readable storage medium of claim 13, wherein the connection pool is configured that it does not need to test a borrowed connection, if the connection was last used within a particular amount of time.

18. The non-transitory computer readable storage medium of claim 13, wherein the connection validation test is performed by the connection pool that executes a SQL statement on a connection, or performs an internal ping if a JDBC driver is used.

* * * * *